May 24, 1927.

A. L. WELSCH ET AL 1,630,150

AUTOMOBILE PUMP

Filed July 6, 1926

August L. Welsch
William H. Welsch
Inventors

By Clarence A. O'Brien
Attorney

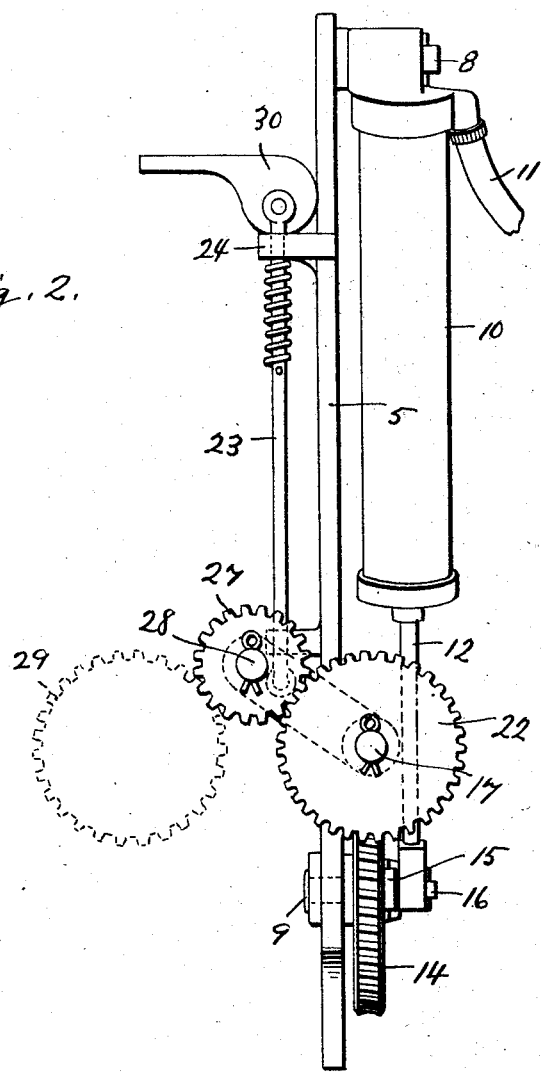

Patented May 24, 1927.

1,630,150

UNITED STATES PATENT OFFICE.

AUGUST L. WELSCH AND WILLIAM H. WELSCH, OF VALMEYER, ILLINOIS.

AUTOMOBILE PUMP.

Application filed July 6, 1926. Serial No. 120,723.

The present invention relates to an air pump in the form of an attachment for an automobile and has for its prime object to provide a structure which is exceedingly compact and convenient, one which is efficient and reliable in operation, strong, durable and simple in construction, inexpensive to manufacture, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Fig. 2 is another elevation thereof taken at right angles to that shown in Fig. 1.

Figure 1:
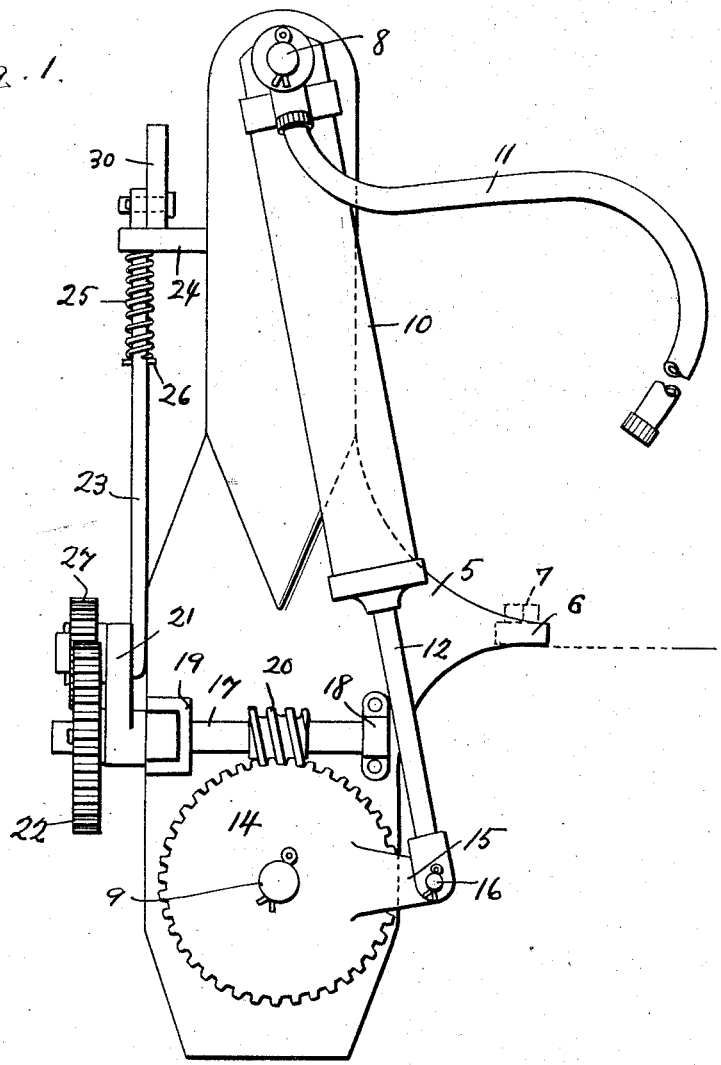
Figure 1 is an elevation of the device embodying the features of our invention.

Referring to the drawing in detail, it will be seen that 5 denotes a frame in the form of a plate having an apertured ear 6 extending from one edge thereof intermediate its ends so that the said frame may be bolted as is indicated at 7 on an automobile engine.

The frame plate extends vertically and at the top thereof there is provided a stud or pin 8 and at the lower end thereof there is provided a stub shaft or pin 9. A pump cylinder 10 has its upper end oscillatorily mounted on the pin 8. A hose of suitable length 11 leads from the end of the cylinder 10 adjacent the pin 8. The piston rod 12 projects through the other end of the cylinder. A worm gear 14 is journaled for rotation on the stub shaft 9 and has a crank 15 radiating therefrom to which is pivotally engaged as at 16 in any suitable manner, the extremity of the piston rod 12.

As the description has thus far progressed, it will be seen that as the worm gear 14 rotates, the piston rod 12 will be reciprocated as is desirable for operating the pump and simultaneously with the reciprocation of the piston rod 12, the cylinder 10 and rod 12 will oscillate in respect to the pin 8. This permits the very compact arrangement of the parts and allows them to operate with great efficiency.

A shaft 17 is journaled in bearings 18 and 19, and has a worm portion 20 formed thereon meshing with a worm gear 14. An arm 21 is rotatable at one end on the shaft 17, at one edge of the plate frame. A gear 22 is fixed to the shaft 17, adjacent the arm 21. A rod 23 is engaged with the arm 21 and pierces an opening provided in a bracket 24 projecting from one edge of the plate frame 5. A spring 25 is disposed about the rod 23 and impinges against the bracket 24 and against a pin 26 extending transversely through the rod 23.

A gear 27 is journaled on a stub shaft 28 at the free end of the arm 21, and is always in mesh with the gear 22. In dotted lines in Fig. 2, we have indicated a drive gear 29 which may be operated by any shaft of the internal combustion engine, preferably the crank shaft, and the spring 25 normally holds the gear 27 in mesh therewith. A cam 30 is mounted on the upper end of the rod 23 and by swinging this cam upwardly, the rod 23 may be lifted as the cam bears against the bracket 24, thereby swinging the arm 21 upwardly and moving the gear 27 out of mesh with the gear 29.

Normally the cam 30 will be in its raised position so as to maintain the gear 27 out of mesh with the gear 29, thereby normally holding the pump inactive. In order to pump a tire up, the cam is swung downwardly thereby causing the spring 25 to act upon the rod 23 for swinging the arm 21 downwardly so as to mesh gear 27 with gear 29. Thus it will be seen that the gear 29 drives gear 27 which in turn drives gear 22. The rotation of gears 22 sets up rotary motion in the shaft 17 so that the worm 20 drives the worm gear 14 for causing the operation of the pump as has heretofore been explained.

It is thought that the present embodiment of the invention will be clearly understood without a more detailed description thereof, and has been shown merely by way of example, since in actual practice it attains the features of advantage enumerated as desirable in the statement of the above invention and the above description. Apparently, numerous changes in the details of construction, and in the combination and arrangement of parts, may be resorted to without departing from the spirit or scope of the invention as hereinafter claimed, or sacrificing any of its advantages.

Having thus described our invention, what we claim as new is:—

1. A device of the class described including a fame, a pump, mechanism for driving the pump, a gear operatively associated with said mechanism, an arm rockably mounted on the axis of said gear, a stub shaft carried at the free end of said arm, a second gear rotatably on said stub shaft meshing with the first gear, a bracket projecting from the frame, a rod slidable through an opening in the bracket and engaged with the arm, a pin projecting through the rod, a spring disposed about the rod impinging against the pin and the bracket.

2. A device of the class described including a frame, a pump, mechanism for driving the pump, a gear operatively associated with said mechanism, an arm rockably mounted on the axis of said gear, a stub shaft carried at the free end of said arm, a second gear rotatable on said stub shaft meshing with the first gear, a bracket projecting from the frame, a rod slidable through an opening in the bracket, and engaged with the arm, a pin projecting through the rod, a spring disposed about the rod impinging against the pin and the bracket, a cam, means for rockably mounting the cam on the end of the rod to engage the bracket whereby the cam may be swung for moving the rod against the compression of the spring.

3. A device of the class described including a supporting frame, a pump, mechanism for driving the pump, a gear operatively associated with said mechanism, an arm, means for rockably mounting the arm to swing on an axis coincident with the axis of said gear, a second gear meshing with the first gear, means for rotatably mounting the second gear on the arm to constantly mesh with the first gear as the arm is swung, and means for swinging the arm to engage the second gear with and to disengage the second gear from a drive gear.

In testimony whereof we affix our signatures.

AUGUST L. WELSCH.
WILLIAM H. WELSCH.